Figure 1:
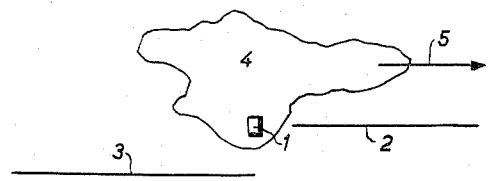

Nov. 1, 1960 H. NASSENSTEIN 2,958,464
PROCESS OF AND APPARATUS FOR THE AUTOMATIC COUNTING
OF PARTICLES OF ANY SIZE AND SHAPE
Filed June 25, 1954 7 Sheets-Sheet 1

INVENTOR.
HEINRICH NASSENSTEIN
BY Burgess + Dinklage

ATTORNEYS

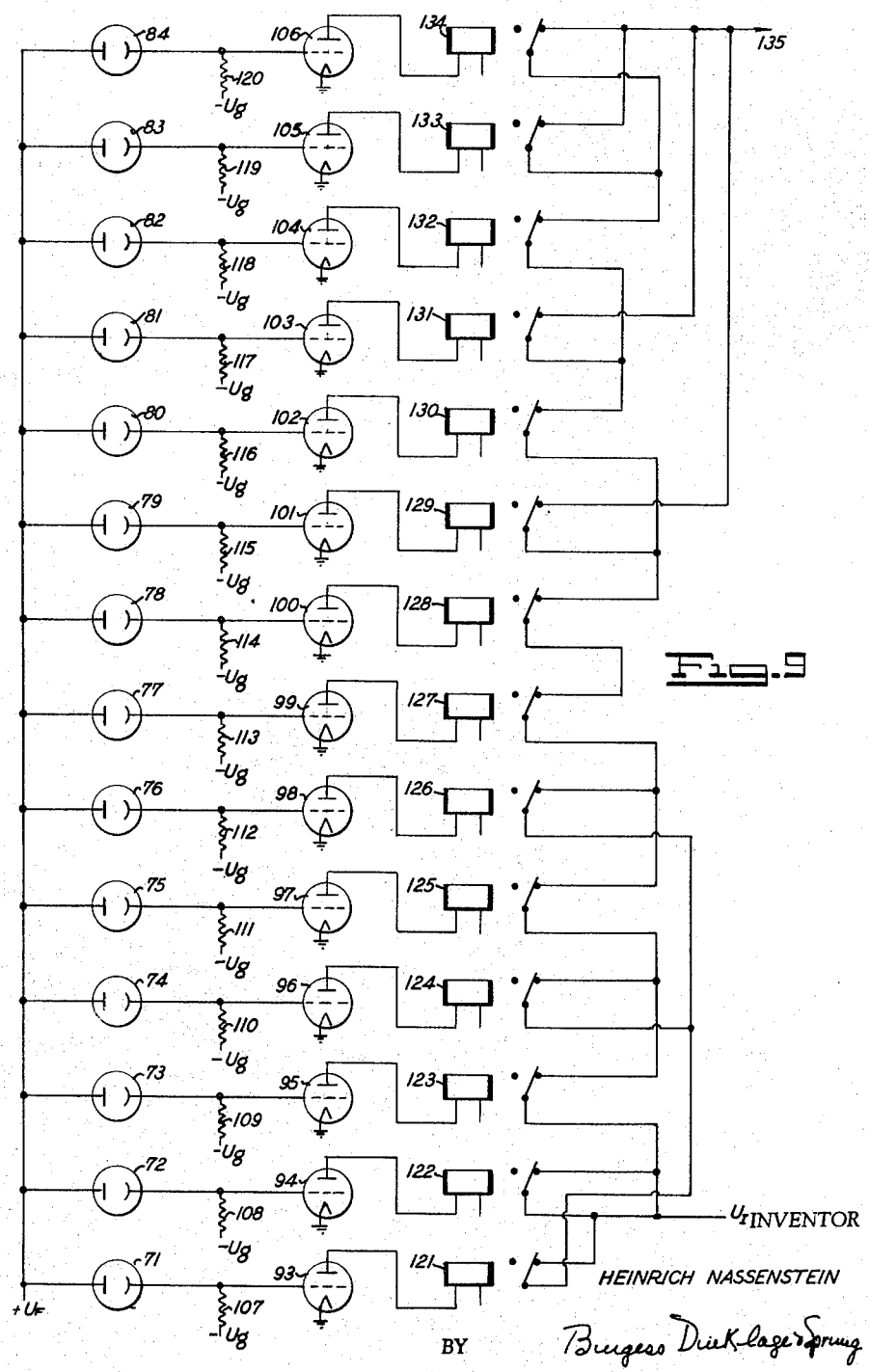

INVENTOR.
HEINRICH NASSENSTEIN though located at a considerable distance behind the particle 4 on the linear means 3. In accordance with the invention, there is, however, the area 7 between the recording means 1 and the linear means 2, which is not subjected to permanent exposure or darkening, so that the counting pulse is not blocked.

United States Patent Office 2,958,464
Patented Nov. 1, 1960

2,958,464
PROCESS OF AND APPARATUS FOR THE AUTOMATIC COUNTING OF PARTICLES OF ANY SIZE AND SHAPE

Heinrich Nassenstein, Opladen, Germany, assignor to Farbenfabriken Bayer Aktiengesellschaft, Leverkusen, Germany, a corporation of Germany Filed June 25, 1954, Ser. No. 439,403

Claims priority, application Germany June 26, 1953

7 Claims. (Cl. 235—92)

The present invention relates to an improved process of, and an apparatus for, the automatic counting of particles of any size and shape, for instance dust particles or blood corpuscles, by passing optically produced images of the said particles along a photo-electric apparatus or moving the said apparatus along such images.

It is customary to provide apparatus of this type with a device for transforming light or dark areas of particle images into electric pulses which operate a counting means and with other means the electric pulses of which control the operation of the counting device. The known methods for counting particles use, for example, two photo-electric cells mounted on the same level, which cells, perpendicularly to the direction of scanning, are arranged at a small distance from each other. In the scanning of the particle images, the electric pulse delivered by the first cell during exposure to light or dark areas of particle images operates a counting device only if the second cell is not exposed to light or dark areas of images. This process has the disadvantages that the particle images must be far away from each other to avoid errors in counting, and that it cannot be adapted to particles of irregular shape.

In accordance with the present invention it has now been found that the aforesaid difficulties are avoided by the use of a recording means of the photo-electric apparatus, which means is capable of delivering an electric pulse actuating the counting device occasioned by scanning a light or dark area of a particle image only if no area between the said recording means and two linear means of the photo-electric apparatus situated in the scanning direction and responsive to such light and dark particle image areas, is continuously exposed to a light or dark area of a particle image depending upon whether the particle images appear light on a dark background or dark on a light background. The linear means are arranged parallel to the direction of scanning; when seen in the direction of scanning, one of these means begins on the same level and at a distance as small as possible behind the recording means; the second linear means is, when seen vertically to the scanning direction, arranged at a distance from the recording means, the said distance being at least equal to the interlacing in scanning (i.e. the distance between adjacent scanning lines).

As long as there is such a continuously exposed area between the recording means and one of the linear means, the recording means cannot operate the counting device. In contrast to the known apparatus, the linear means alone cannot automatically block the counting pulse of the recording means during exposure but only if there is at least one area between the recording means and at least one of the linear means which is continuously exposed as aforesaid. By this arrangement it is safely ensured that every particle, independently of its size and shape, is counted as often as the interlacing in scanning is contained in the distance between the recording means and the second linear means, i.e. every particle is counted only once for instance if the interlacing in scanning is equal to the distance between the recording means and the second linear means.

This is true for the following reason: Every particle image has one point which, vertically with respect to the scanning direction, is the deepest. When this point of the particle image reaches the recording means of the photo-electric apparatus the counting device is operated. In the next scanning line, the deepest point of the particle image is always beneath the second linear means provided that the interlacing is equal to the distance between the recording means and the second linear means. On the passage of the particle image across the path of the recording means in said next scanning line there is now an area between the recording means and the second linear means, which area is continuously exposed to that portion of the particle image situated above the second linear means; the electric pulse of the recording means, which otherwise operates the counting device, is thereby blocked so that a second counting of the particles does not take place.

Figure 5:
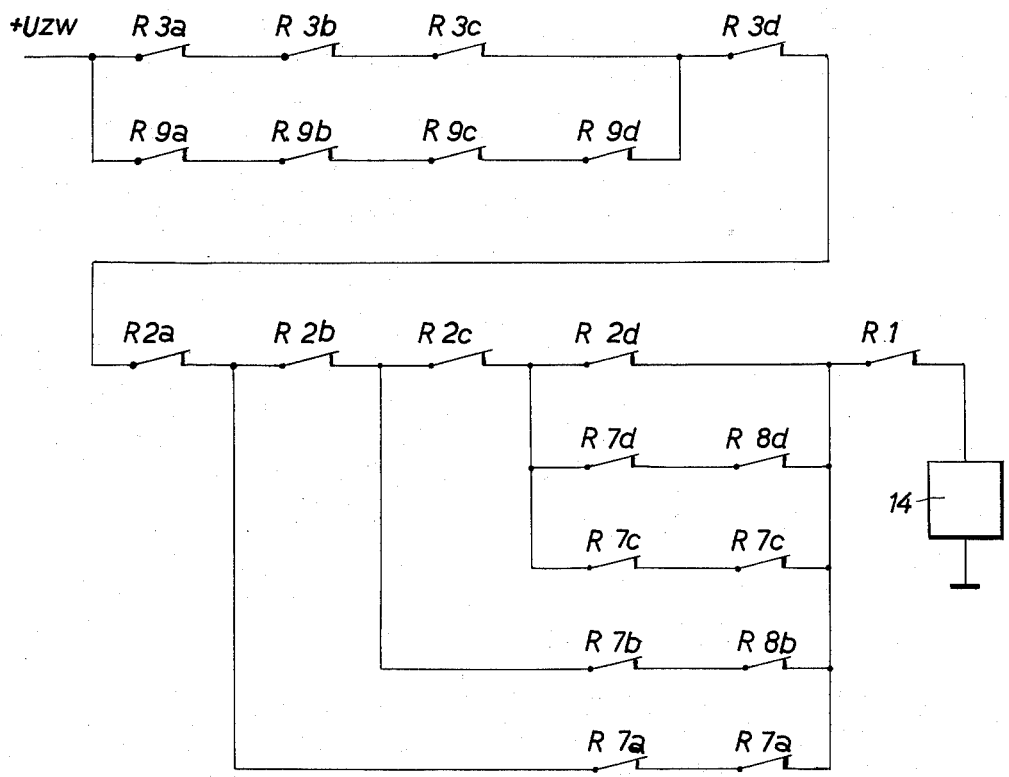
Figure 6:
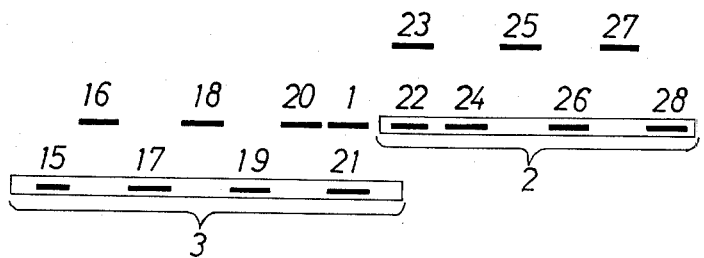
Figure 6A:
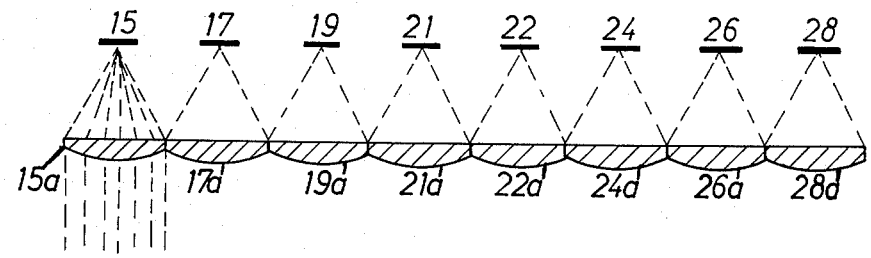
Figure 7:
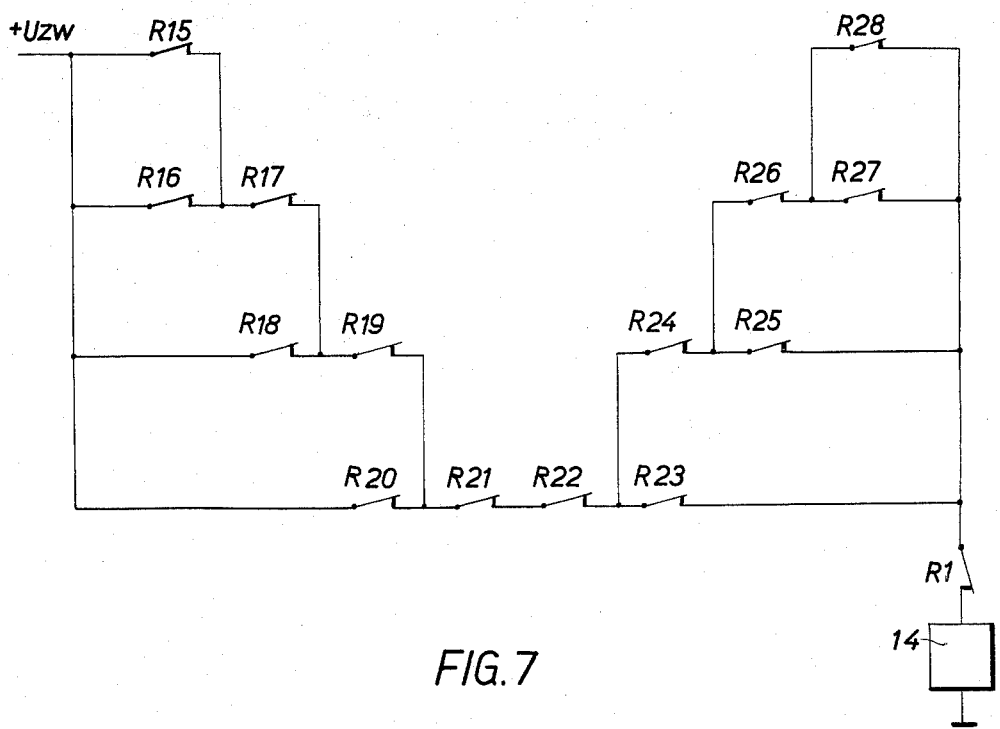
Figure 10:
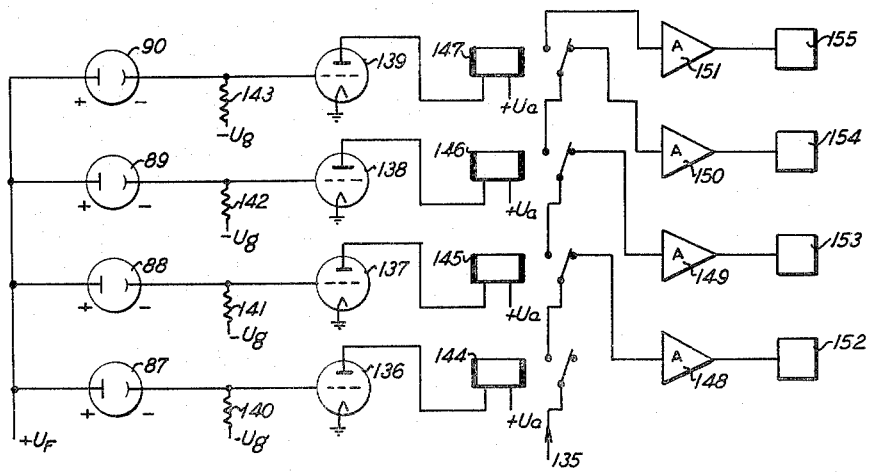
Figure 9:
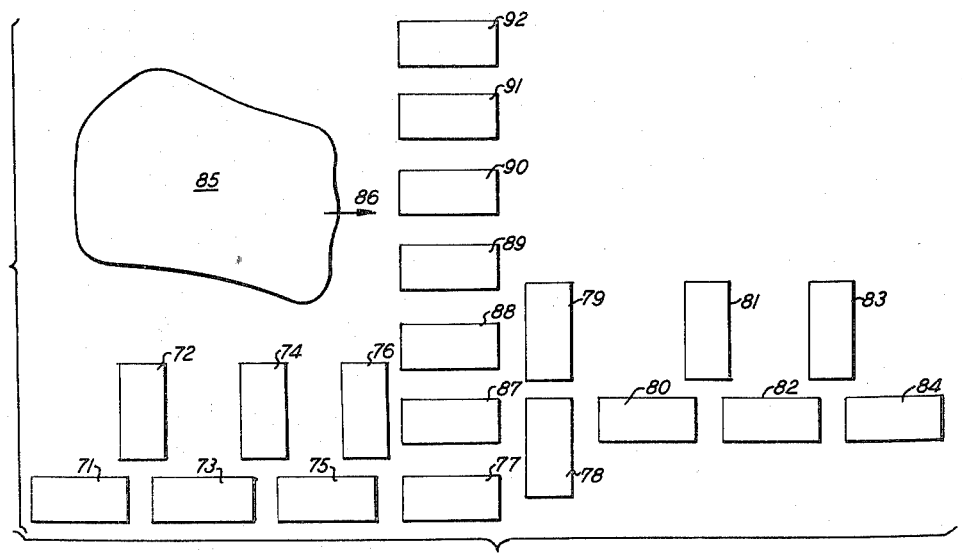

Some embodiments of the invention are shown by way of example in the accompanying drawings, the figures of which are diagrams illustrating the invention. Figs. 1–4 illustrate the principles of the invention as applied to the detection of particles of various shapes. Fig. 5 illustrates the circuit of the embodiment shown in Fig. 4. Fig. 6 is a side elevation of one embodiment. Fig. 6a is a top view of an embodiment. Fig. 7 illustrates the connection of photo-electrical elements as photo-electrical resistances. Fig. 8 shows an embodiment using photo-electric cells and Figs. 9 and 10 show the wiring circuit therefor.

In Fig. 1, 1 refers to a recording means, 2 and 3 to a linear means of the apparatus. A particle 4, which is irregularly shaped, moves in the direction of scanning indicated by arrow 5. At the instant shown in the drawing, the particle 4 is measured on its passage over the recording means 1.

Figure 2:
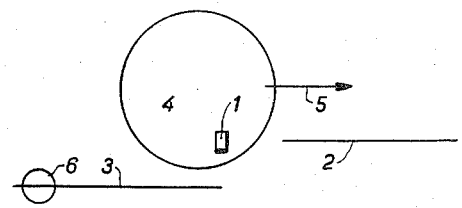

In Fig. 2 a circular particle 4 is shown in the counting position, and another circular particle 6, which has already been counted in the preceding line, is positioned on the linear means 3. If the linear means should automatically block the counting pulses of the recording means during exposure or darkening, the particle 4 would erroneously not be counted because the linear means 3 is exposed or darkened by the particle 6. However, according to the invention, the counting pulse is not blocked, since the area between the means 1 and the means 3 is not continuously exposed or darkened at any spot.

The purpose of the linear means, which, when seen in scanning direction, is placed behind the recording means, is to prevent the multiple counting of the particles, even when irregularly shaped. If the shape of the particle to be counted has, for instance, two deepest points at the same level, no pulse actuating the counting device is delivered at the instant the second deepest point travels over the recording means, because the first deepest point of the particle is at the same moment beneath this linear means, and, therefore, an area between the recording means and this linear means is continuously exposed. The same applies mutatis mutandis to dark particles on a light ground. The particle as such prevents multiple counting by forming a bridge over the area between the recording means and the linear means.

Figure 3:
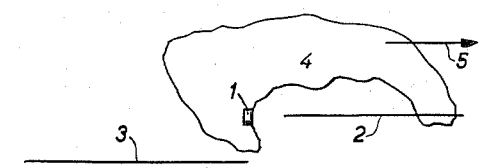

Fig. 3 shows a particle of irregular shape, which would be counted a second time in the previously known apparatus (in the position as shown in the drawing), since the recording means 1 is exposed once more after darkening through the recess of the particle image moving in the direction of the arrow 5 by the downwardly salient portion of the particle image. According to the invention, however, the pulse is blocked, since the particle area forms a bridge between the means 1 and 2.

For practising the process of the invention, the means of the photo-electric apparatus may be designed as electrodes, and the intermediary area of the apparatus as a layer with an inner photo-electric effect. The recording means then consists of two electrodes placed immediately side by side, which electrodes are connected through the photo layer; the linear means are individual electrodes (see Fig. 3a). The apparatus can, for instance, be connected as follows (see Fig. 3b): One electrode (1a) of the recording means, has a positive voltage, the other (1b) is connected to the grid of an electron tube ET, which contains such a negative grid bias $U_g$ over a grid resistance 12 that the current change responsive to image exposure between the electrodes of the recording means will not overcome the blocking of the anode current. In the anode circuit ($+U_a=$ anode voltage) there is an open-circuit relay 13 which is capable of connecting a counting device 14 to a direct-current supply ($+U_{zw}$). In this circuit consisting of voltage source, counting device and relay contacts, there are also the contacts of a closed circuit relay 13a. This relay is operated through an analogous amplifier installation when one of the linear electrodes 2,3 is in photo-conductive connection with the live electrode 1a of the recording means. By exposing the area between the two electrodes of the recording means, a larger potential drop is effected at the grid resistance by the larger photo current ($+U_f+$ auxiliary voltage for photo-electric cells). The grid of the electron tube is thus given a more positive potential. The anode current flows and operates the open-circuit relay 13 which can lead to the operation of the counting device 14. If, however, the particle image forms a photo conductive bridge to one of the linear electrodes, the closed circuit relay 13a is broken so that the counting device cannot be operated by the open-circuit relay in spite of the exposure of the recording means. Other circuit organizations are also within the scope of the invention claimed in the appended claims.

The operation of the closed circuit relay prior to the operation of the open circuit relay is safely attained by the installation of a live electrode of the recording means which is larger than the second electrode (see Fig. 3a), or by the use of a suitable delay switch or an open-circuit relay with a delaying action.

Figure 3A:
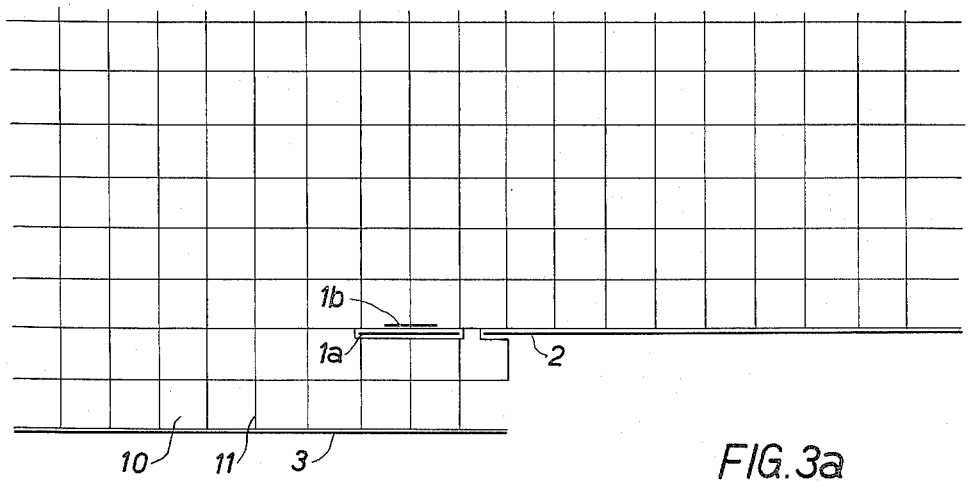

The sensitivity of the apparatus can be increased by the use of a raster of metallic spots 10 with photo-electric bridges 11, instead of a continuous layer with inner photo-electric effect between the live electrode of the recording means and the electrodes of the linear means (see Fig. 3a).

The means of the apparatus may also consist of several individual photo cells with external photo-electric effect; in this case additional photo cells are arranged in suitable coincidence circuit with the photo cells of the linear means.

The apparatus for carrying out the process of the invention may also consist of several secondary electron multipliers; in this case, additional secondary electron multipliers are arranged in a suitable coincidence circuit with the secondary electron multipliers of the linear means. Besides, the means may consist of photo elements which are provided with additional photo elements in suitable coincidence circuit with the photo elements of the linear means.

Figure 4:
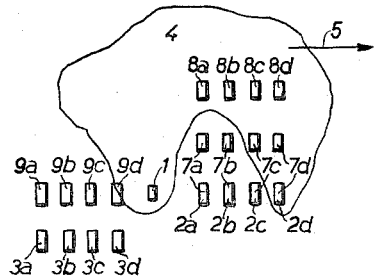

Fig. 4 shows an apparatus according to which the linear means (2a, 2b, 2c, 2d, and 3a, 3b, 3c, 3d) are designed as photo-electric cells or as secondary electron multipliers. The recording means is likewise a photo-electric cell or a secondary electron multiplier. Additional photo cells with external photo-electric effect or secondary electron multipliers (9a, 9b, 9c, 9d, 7a, 7b, 7c, 7d, and 8a, 8b, 8c, 8d) are also provided. A particle, which, for instance, is light on a dark ground, is counted at the instant the cell is exposed. The counting pulse is blocked, however, if, for instance, at least one of the following conditions is met:

(1) The element 3d or 2a is exposed,
(2) The element 3c and at least one of the elements 9a–d are exposed,
(3) The element 3b and at least one of the elements 9a–d are exposed,
(4) The element 3a and at least one of the elements 9a–d are exposed,
(5) The element 2b and at least one of the elements 7a or 8a are exposed,
(6) The element 2c and one of the elements 7b or 8b, and, at the same time, one of the elements 7a or 8a are exposed,
(7) The element 2d and one of the elements 7d or 8d, and, at the same time, 7c or 8c, and, simultaneously, 7b or 8b, and simultaneously, 7a or 8a are exposed.

According to Fig. 4, the particle 4 is, for instance, of irregular shape, and is passed along in the direction of scanning 5 over the photo-electric device. In the position shown in the drawing, the particle is not again counted, since the elements 2d, 7c, and 7d, 8a–d are exposed. If the particle images are farther off from each other, or of regular shape, for instance, circular, a smaller number of photo-electric cells will do to secure a reliable counting operation.

The cells with external photo-electric effect, the secondary electron multipliers and the photo elements may also be combined into one cell. Each of the hereinbefore described means can be combined with a measuring cell which measures the size of the counted particle image. The circuit is operated so that the measuring cell effects measuring only at the instant of counting the particle. If one of the hereinbefore described means and the measuring cell are arranged in series in the scanning direction, allowance has to be made for the time the particle image requires for the travel between the photo-electric device and the measuring cell; this is accomplished by the use of a suitable delay circuit in such a manner that the dimensions of the particle image are measured by the measuring cell not before the particle image reaches the cell.

It is also possible to avoid the delay circuit by combining one of the hereinbefore described photo-electric devices and the measuring cell into one apparatus.

A circuit, controlling Fig. 4 so that it will act as described before, is shown in Fig. 5.

The coincidence conditions are here realized by the relays R3a, R3b, R3c, R3d, R9a, R9b, R9c, R9d, R2a, R2b, R2c, R2d, R7d, R8d, R7c, R8c, R7b, R8b, R7a, R8a, R2a, R2b, R2c, R2d, the contacts of which are shown in Fig. 5. The relay coils as such are positioned in the anode circuits of electron tubes to the grid of which the corresponding photo-electrical cell is connected. The circuit is analogous to that of the relay 13a in Fig. 3b. The relay $R_1$ is connected in the same manner as relay 13 in Fig. 3b.

Fig. 6 is a side elevation and Fig. 6a a top view of the embodiment of the apparatus for carrying out the herein described process, wherein the linear means are designed as photo-electrical elements and additional photo-electrical elements are arranged in coincidence circuits. Thus, the linear means 3 consists of the photo-electrical elements 15, 17, 19 and 21; the cells 16, 18, and 20 serve to control the blocking conditions set forth below. The linear means 2 consists of the cells 22, 24, 26, and 28; on this side, the cells 23, 25, and 27 act as coincidence cells. The interspaces between the individual elements of the linear means 2 and 3 are bridged over by the use of cylinder lenses 15a, 17a, 21a, 24a, 26a, 28a (see Fig. 6a).

The cylinder lenses 15a, 17a, 19a and 21a as well as 22a, 24a, 26a and 28a serve to ensure that on the passage of a particle image across the linear photo-electric means 3 and 2 respectively, blocking of the counting pulse of the first photo-electric means 1 is continuously maintained. Without such arrangement of the aforesaid cylinder lenses, the blocking of the counting pulse of the first photo-electric means would be otherwise interrupted when the particle image becomes positioned in one of the interspaces between the photo-electric elements 15, 17, 19 and 21, 22, 24, 26 and 28.

As it is known in the art, the photo-electrical elements can also be connected as photo-electrical resistances. The circuit shown in Fig. 7 blocks the counting pulse of the first photo-electric means 1 to which the relay $R_1$ is connected, if at least one of the following conditions is fulfilled:

(1) The element 21 or 22 is exposed;
(2) The elements 19 and 20 are exposed at the same time;
(3) The elements 17, 18, and 20 are exposed at the same time;
(4) The elements 15, 16, 18, and 20 are exposed at the same time;
(5) The elements 23 and 24 are exposed at the same time;
(6) The elements 26, 25, and 23 are exposed at the same time;
(7) The elements 28, 27, 25, and 23 are exposed at the same time.

Fig. 7 shows only the contacts of the relays, which are arranged in the anode circuits of the tubes, to the grids of which are connected the corresponding photo-electrical elements. The circuit can, of course, also be accomplished by other means; for instance, the relays may be replaced by electron tube circuits (electronic relays).

The principle of the invention may best be understood in connection with a microphotograph of a dispersed system, the particles of which are to be counted and which photograph is so prepared that the particle images are more light transmissive than their surroundings. This microphotograph is maintained vertically in a frame illuminated from the rear, and then moved through a specific arranged photocell construction in accordance with the invention in a horizontal direction. At the end of each horizontal line, a vertical movement of the picture takes place over a predetermined distance. Portrayed through an objective, the pictured small particles wander linearly across the photocells. The principle of the apparatus lies in that each particle, regardless of how often it is moved across the photocells, is only once numerically picked up. This corresponds, therefore, to a counting of the particles, the size being measured at the same instant by a geometrical arrangement of the photocells, i.e., also only once for each particle.

The subject area, in accordance with the invention, is exposed or darkened by the particle images migrating across the photo-electric cells, said area being that area between a first photo-electric or recording means 1, and one of the two linear photo-electric means 2 or 3 which is exposed across its entire surface. This means that exposure of the linear means 2 or 3 is effected by the particle image which exposes the photo-electric means.

The photo-electric or recording means may be, for example, a photo-electric cell which is arranged within the apparatus in such a manner that a counting device can be connected to the photo-electric cell, if desired, via one or more amplifier stages. Again the recording means may also be formed of two metal electrodes which are connected to one another by a photoconductive layer such as for example, a photoconductive cell. Fig. 3a illustrates such a photoconductive layer having a number of electrodes.

Figure 3B:
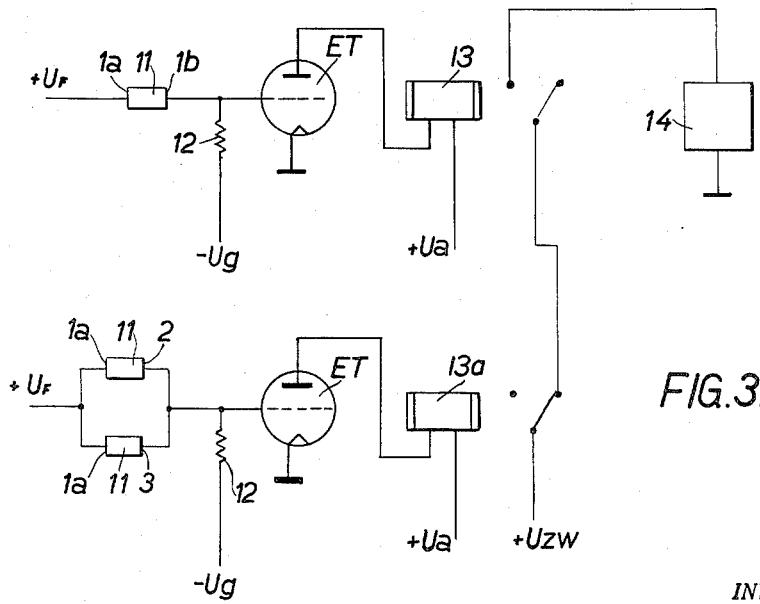

Thus, where the particular means used has a surface with inner photo-electric effect, the same may be in the form of a conventional cadmium sulfide layer, while on the other hand where the means has a surface with external photo-electric effect, or consists of secondary electron multipliers, any suitable commercial photo-cell may be used. The arrangement and circuit of these elements are shown in Figs. 3a and 3b. Conventional photo elements; or individual photo-electric cells, electron multipliers, or photo-elements combined in one cell; may also be used. The arrangement and circuit of these various means is the same as seen from Figs. 4 and 5, although, of course, the particular known photo-electric means is different in each case.

With specific reference to the apparatus for counting of particles in accordance with the invention connected for use with a measuring cell capable of measuring the size of every counted particle once during the counting of said particle, further reference is made to the drawings in which, Fig. 8 shows a construction in which the elements of a measuring and photo-electric device are photo-electric cells, and Figs. 9 and 10 show the pertinent wiring circuit therefor.

The photo-electric device of the measuring devices can be arranged in a line which runs vertical to the direction of movement of the particles. The particle size which is thereby measured is equal to the diameter when the particle is of circular shape; the size of particles of irregular shape is either equal to the statistical diameter according to Feret or almost equal to the statistical diameter according to Martin depending upon the length of the measuring means (see Herdan, Small Particle Statistics; Amsterdam (1953) page 66). The circuit can be closed so that each photo-electric element will operate a counting means only after all the elements arranged in the row of the elements in front of this element have responded. For instance, if a microphotograph of droplets is scanned in this manner and the photo-electric elements of the measuring means are all mounted at a distance of 1 millimeter from one another, the first counting means counts all the droplets; the second counting means counts all the droplets having a diameter larger than 1 millimeter, the third counting means counts the droplets having a diameter larger than 2 millimeters. As a rule, the $n$th counting means counts all the droplets having a diameter larger than $n-1$ millimeter. Hence, it follows that the counting means indicates the complete size distribution of the droplets immediately without any calculation. The photo-electric devices may also be connected in such a manner that only the last of these devices, which are exposed to light or darkened by a particle, can actuate a counting means.

Fig. 8 shows a construction of the apparatus in which the elements of the measuring means and of the photo-electric means are photo-cells having a photo-electric effect. The photocells 71–84 of the photo-electric device insure that every particle, as for example 85, which moves over the field in scanning direction 86 is counted only once when in a definite position. The interspaces between the photo-cells 71, 73, 75, 77 and 78, 80, 82 and 84 can also be bridged over by the use of mirrors or lenses. 87, 88, 89, 90, 91 and 92 are the photo-cells of the measuring device; 87 is identical with the recording element of the photo-electric device. The number of these photo-cells can naturally be further multiplied as desired. The pertinent wiring or circuit is shown in Figs. 9 and 10. Fig. 9 shows the connection of the cells of the photo-electric device. Every one of the photo-cells 71–84 lies in the grid of one of the electron tubes 93–106 and simultaneously at the positive $+U_F$. These tubes receive over the grid resistance 107–120, such a negative initial grid tension $-U_g$, that no anode stream flows into the tubes if the photo-cell, which is attached to the tube is not irradiated. If a photo-cell is irradiated by the picture of particles, the grid of the tubes receives a positive potential, the anode stream flows and activates the relay which lies in the anode circuit of the tubes. These relays are indicated with the numbers 121–134, $+U_A$ is the anode potential of the tubes. The contacts of the relays 121–134 are so wired that the impulse tension $U_I$ is always interrupted when at least one of the following conditions is filled:

(1) The photo-cell 77 or 78 is irradiated;
(2) The cells 76 and simultaneously 75 are irradiated;
(3) The cells 79 and simultaneously 80 are irradiated;
(4) The cells 76 and simultaneously 74 and 73 are irradiated;
(5) The cells 79 and simultaneously 81 and 82 are irradiated;
(6) The cells 79 and simultaneously 81 and 83 and 84 are irradiated;
(7) The cells 76 and simultaneously 74 and 72 and 71 are irradiated.

If one of these conditions is fulfilled, no impulse tension any longer exists at the connection 135. In Fig. 10 the further conducting of the impulse voltage in the measuring device is shown. The photo-cells 87–90 are again, analogously as before, attached to the grid of the electron tubes 136–139; 140–143 are the pertinent grid resistances, 148–151 are supporting steps or amplifiers which lie before the members 152–155, which are counters. The connection of the relays 144–147 is here so carried out, that only the last one in the row of the irradiated photo-cells can furnish a counting impulse to the counting device, i.e., a differential curve of the distribution of the amount of particles is obtained. The condition realized in the circuit is that a counting channel (for example 150 and 154) contains a counting impulse, are as follows:

(1) The pertinent photo-cell (in 89) is irradiated.
(2) All photo-cells which lie lower in the arrangement (in 87 and 88) are irradiated.
(3) The following photo-cell (in 90) is not irradiated.
(4) None of the above cited conditions for the interruption of the impulse voltage is fulfilled.

Condition 3 is realized in the circuit in that every counting channel receives its impulse potential over the resting contact of the relay positioned next in the row.

I claim:

1. Apparatus for the automatic counting of particles of any size and shape by scanning the optically produced images of the particles which comprises means including a first photo-electric means responsive to scanning the optical images of particles to produce electric pulses, said first photo-electric means being connected to operate a counting device, two linear photo-electric means for producing electrical pulses responsive to the scanning of optical images of particles, the first of said linear photo-electric means extending parallel to the scanning direction and terminating at a point in a line normal to the scanning direction passing through said first photo-electric means, said first linear photo-electric means being spaced from said first photo-electric means a distance at most equal to the distance between scanning lines, the second of said linear photo-electric means being parallel to said first linear photo-electric means and beginning at a point beyond said first photo-electric means in a line parallel to said scanning direction passing through said first photo-electric means and blocking means responsive to the optical images of particles occupying a continuous portion of a scanning area between said first photo-electric means and at least one of said linear photo-electric means, said blocking means being capable of blocking the pulses of said first photo-electric means only where said continuous scanning area is occupied by a particle.

2. Apparatus in accordance with claim 1 wherein said first photo-electric means and said linear photo-electric means include electrodes and said blocking means includes a surface having inner photo-electric effect.

3. Apparatus in accordance with claim 2 wherein said blocking means includes a raster of metallic spots connected by intermediate photo-electric bridges.

4. Apparatus in accordance with claim 1 wherein said first photo-electric means and said linear photo-electric means include a plurality of individual photo-electric cells having external photo-electric effect, a portion of the cells of said linear photo-electric means being arranged in a coincidence circuit.

5. Apparatus in accordance with claim 1 wherein said first photo-electric means and said linear photo-electric means include a plurality of secondary electron multipliers, a portion of the electron multipliers of said linear means being arranged in a coincidence circuit.

6. Apparatus in accordance with claim 1 wherein said first photo-electric means and said linear photo-electric means include a plurality of photo-elements, a portion of the photo-elements of said linear means being arranged in a coincidence circuit.

7. Apparatus in accordance with claim 1 wherein said first photo-electric means is connected for use with a measuring cell capable of measuring the size of every counted particle once during the counting of said particle.

References Cited in the file of this patent

UNITED STATES PATENTS

| | | |
|---|---|---|
| 2,085,671 | Powers | July 29, 1937 |
| 2,231,186 | Gould | Feb. 11, 1941 |
| 2,369,577 | Kielland | May 12, 1941 |
| 2,584,052 | Sandorff | Aug. 30, 1949 |
| 2,791,377 | Dell et al. | May 7, 1957 |
| 2,791,695 | Bareford et al. | May 7, 1957 |
| 2,791,697 | Dell | May 7, 1957 |